(No Model.)
V. B. BARSTOW & S. H. MALLORY.
WHIP CORE.
No. 255,131. Patented Mar. 21, 1882.
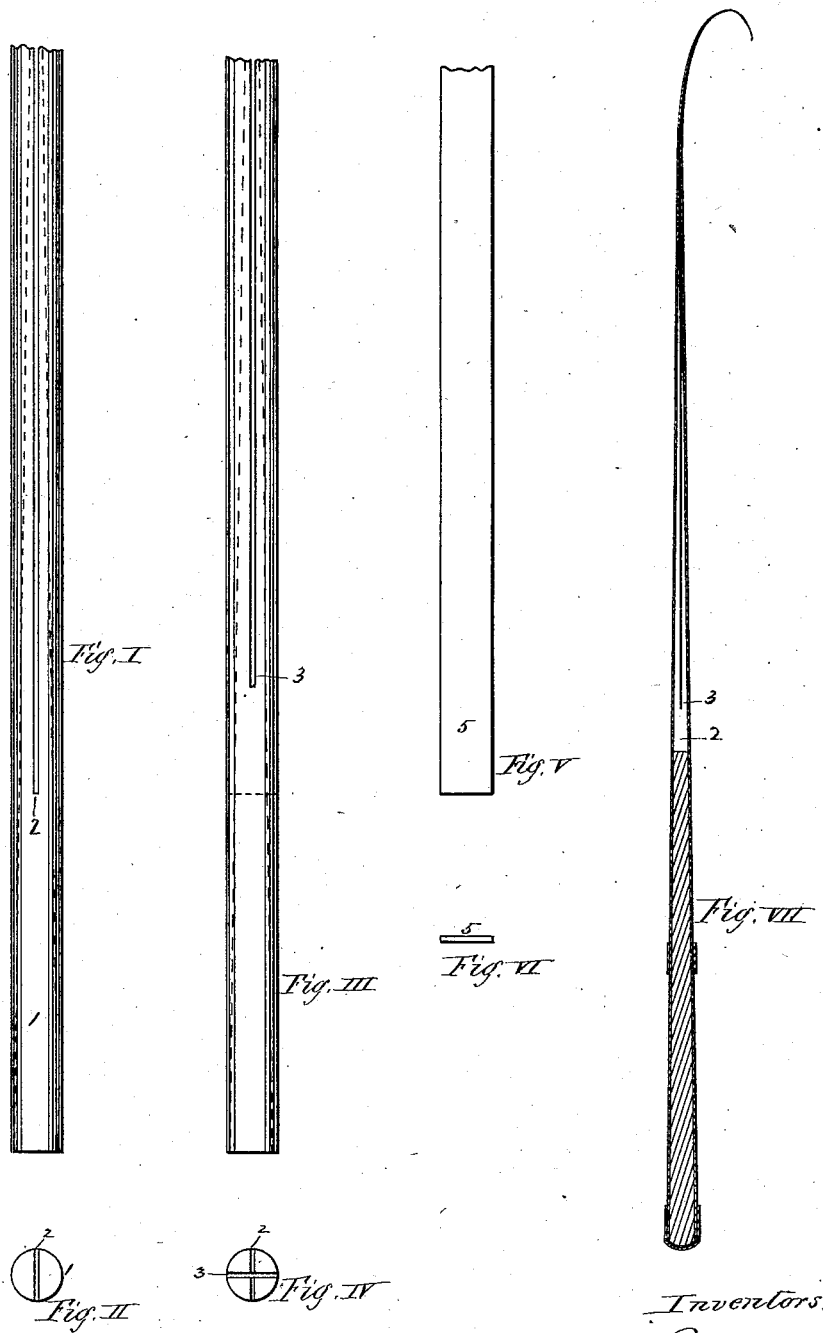
Witnesses.
Chas. H. Wood
M. C. Stebbins
Inventors.
Vinal B. Barstow
Stanton H. Mallory
By T. A. Curtis
their Atty.
N. PETERS, Photo-Lithographer, Washington, D. C.

UNITED STATES PATENT OFFICE.

VINAL B. BARSTOW AND STANTON H. MALLORY, OF WESTFIELD, MASS.

WHIP-CORE.

SPECIFICATION forming part of Letters Patent No. 255,131, dated March 21, 1882.

Application filed February 3, 1882. (No model.)

*To all whom it may concern:*

Be it known that we, VINAL B. BARSTOW and STANTON H. MALLORY, both of Westfield, in the county of Hampden and State of Massachusetts, have invented a new and useful Improved Whip-Core, of which the following is a specification and description.

The object of our invention is to provide a whip-core which is cheap, durable, and possessing all the elastic qualities of whalebone, and which is stronger than the ordinary rawhide core now used in the manufacture of whips in connection with rattan; and we accomplish this by the means substantially as hereinafter described, and illustrated in the accompanying drawings, in which—

Figure I is a side view of a piece of rattan sawed in from one end lengthwise to receive a flat rawhide strip to form a whip-core. Fig. II is an end view of the same. Fig. III is a side view of the same rattan piece having two saw-kerfs to receive two flat rawhide strips to form a whip-core. Fig. IV is an end view of the same. Fig. V is a side view of the flat rawhide strip to be inserted into the saw-kerfs made in the rattan piece. Fig. VI is an end view of the same, and Fig. VII is a longitudinal section of a finished whip having our improved core.

In the drawings, 1 represents a piece of rattan of suitable size and length for the whip-core, and of preferably the same, or substantially the same, diameter throughout; and we saw into this piece from one end for any desired portion of its length and along the line of its axis, as shown at 2 in Fig. I; and into this kerf made by the saw we insert a thin flat strip or sheet of rawhide, as 5, gluing the same firmly into the saw-kerf and allowing it to dry thoroughly. We then saw into the same end of the strip of rattan, making the kerf at an angle with the other kerf, (the two kerfs being made preferably at right angles to each other, as shown at 2 and 3,) and for a different portion of the length of the rattan piece, in order that the two kerfs may not terminate at the same point, and thereby weaken the piece, and we securely glue into this second kerf a similar strip of rawhide. These thin flat sheets or strips of rawhide completely close up the saw-kerfs, and when thoroughly dry we place this rattan piece so prepared in a lathe, or some similar machine, and turn it down to the desired taper and size from end to end; or we may work it down to the desired size and taper, giving it a four-sided form. This core then forms the tip portion of the whip, and may be attached to another portion of different material, if desired, to form the butt, with the ordinary wedge attached; or this piece may be of the full size of the whip and extend the whole length and be platted in the ordinary manner either upon some other preliminary covering or coating and with some water-proof preparation, or finished in any desired manner. Any desired number of these saw-kerfs may be made and filled with a corresponding number of thin flat rawhide strips; but two kerfs, each filled with a rawhide strip, will ordinarily be quite sufficient.

It is evident that a thin flat strip of rawhide will offer greater resistance to power applied in the direction of its width than the same amount of rawhide in any other form; and it is obvious that in this application of rawhide to a rattan core the greatest amount of strength and elasticity is obtained with the minimum amount of rawhide. We are also enabled to use the thinnest strips of rawhide, even that quality which hitherto has been thrown into the waste as unfit for use; and yet we obtain therefrom a great degree of strength and elasticity, and furnish a whip which is tough and durable, and which possesses all the qualities of good whalebone, and at a trifling expense as compared with whalebone.

If this core be made of a four-sided form, it may be built up to form a whip by the addition of the ordinary siding and chink pieces.

Having thus described our invention, what we claim as new is—

An improved whip-core consisting of a rattan piece having longitudinal saw-kerfs made therein, combined with thin flat rawhide strips glued into said saw-kerfs, substantially as described.

VINAL B. BARSTOW.
STANTON H. MALLORY.

Witnesses:
T. A. CURTIS,
CHAS. H. WOOD.